United States Patent
Hansen et al.

(10) Patent No.: US 7,718,923 B1
(45) Date of Patent: May 18, 2010

(54) DEFROSTING WINDSHIELD SUNSHADE PANEL

(76) Inventors: Scott P. Hansen, 62821 E. 312 Rd., Grove, OK (US) 74344; Mary J. Hunt-Hansen, 62821 E. 312 Rd., Grove, OK (US) 74344

( * ) Notice: Subject to any disclaimer, the term of this patent is extended or adjusted under 35 U.S.C. 154(b) by 514 days.

(21) Appl. No.: 11/704,746

(22) Filed: Feb. 9, 2007

(51) Int. Cl.
*B60L 1/02* (2006.01)
*B60J 1/20* (2006.01)

(52) U.S. Cl. .................. 219/203; 219/202; 219/213; 219/214; 219/528; 219/529; 219/548; 219/549; 219/535; 160/370.21; 160/370.22; 160/370.23; 296/97.4; 296/97.5; 296/97.8; 296/97.9; 296/97.11; 52/171.2

(58) Field of Classification Search ............. 219/202–3, 219/213–214, 218–19, 528–29, 548–49, 219/535; 160/370.21, 370.22, 370.23; 296/97.5, 296/97.4, 97.11, 97.9, 97.8; 52/171.2
See application file for complete search history.

(56) References Cited

U.S. PATENT DOCUMENTS

| | | | |
|---|---|---|---|
| 3,336,969 A | 8/1967 | Marchman | |
| 3,594,547 A * | 7/1971 | Quinn | ........................ 219/529 |
| 4,399,347 A | 8/1983 | Schmitt | |
| 4,790,591 A | 12/1988 | Miller | |
| 4,877,074 A | 10/1989 | Castellano | |
| 5,024,262 A | 6/1991 | Huang | |
| 5,562,142 A | 10/1996 | Ziel | |
| 2004/0201244 A1* | 10/2004 | Neuer et al. | ............. 296/136.1 |

* cited by examiner

*Primary Examiner*—Shawntina Fuqua
(74) *Attorney, Agent, or Firm*—Randal D. Hamburg

(57) ABSTRACT

A sunshade for an automobile placed upon a dashboard in the interior of the vehicle provides a reflective outer surface to deflect heat and sunlight through the windshield into a vehicle during hot weather conditions and also provides the outer surface with heat strip elements when enabled during cold weather to provide a radiant heat to the windshield to prevent ice build-up on the windshield maintaining a clear windshield during freezing temperatures, the heat strip elements drawings a low voltage current from a rechargeable battery supply or a 12 volt DC power from a cigarette lighter plug, or both.

7 Claims, 5 Drawing Sheets

DEFROSTING WINDSHIELD SUNSHADE PANEL

CROSS REFERENCE TO RELATED APPLICATIONS

None

I. BACKGROUND OF THE INVENTION

1. Field of Invention

A sunshade for an automobile placed upon a dashboard in the interior of the vehicle provides a reflective outer surface to deflect heat and sunlight through the windshield into a vehicle during hot weather conditions and also provides the outer surface with heat strip elements when enabled during cold weather to provide a radiant heat to the windshield to prevent ice build-up on the windshield maintaining a clear windshield during freezing temperatures, the heat strip elements drawings a low voltage current from a rechargeable battery supply or a 12 volt DC power from a cigarette lighter plug, or both.

2. Description of Prior Art

The following United States patents were discovered and are disclosed within this application for utility patent. All relate to windshield sun screen devices or windshield protectors.

In U.S. Pat. No. 5,562,142 to Zeil, a folding dash shield and seat shield in disclosed having VELCRO fastening devices to attach the shield to the windshield and side windows. A removable screen, also fastening by VELCRO is disclosed in U.S. Pat. No. 4,790,591 to Miller. U.S. Pat. No. 4,399,347 to Schmitt has a flexible panel attached to a windshield by suction cups. All three of these patents use a reflective material to shield the interior of a vehicle from sunlight and diminish the amount of heat build-up in the vehicle interior.

U.S. Pat. No. 4,877,074 to Castellano is a multiple folding panel having a reflective material on the windshield side of the panel to reflect heat and shade the interior of the vehicle. An externally affixed fabric panel is disclosed in U.S. Pat. No. 3,336,969 to Marchman, which shield the interior, but also covers the exterior for inclement weather conditions. A fabric panel with a flexible and folding perimeter is disclosed in U.S. Pat. No. 5,024,262 to Huang.

None of the disclosed patents identified in the prior art discloses an interior windshield panel having any sort of heating means to prevent frosting or ice buildup on a windshield during cold weather and also serve as a heat deflection means during the summer.

II. SUMMARY OF THE INVENTION

Front windshield shade and protection devices have been in production and the subject matter of numerous patents for quite some time. They are embodied as fabric sheets attaching to the exterior or interior of a vehicle's windshield through some form of attachment means, or provided as folding panels that extend to cover the inside of the windshield while seated upon the dashboard. In most cases, they are provided to shade the interior of the vehicle from the light coming through the windshield in warm or hot weather, some provided with a reflective surface facing the windshield when deployed. However, none of them disclose a means of providing an active radiant heat to the windshield to heat the windshield during very cold conditions where ice and snow accumulate on the outer surface of the windshield, other than to possible reflect sunlight back to the windshield.

The present windshield screen device provides protection from the sunlight, much like the prior art patents disclosed, but it also provides a radiant heat on the outer surface of the screen device directed towards the inner surface of the windshield, the radiant heat provided by heat strips on the outer surface directed towards the windshield powered by a 12 volt DC power supply on the vehicle or by rechargeable solar batteries which are recharged by solar panels on the outer surface of the screen device, or both. The low level heat produced by the heat strips would produce an amount of heat intended to heat the windshield to discourage ice build-up or frost on the windshield. It may also serve as an emergency heat source in the event a vehicle is stranded in foul weather, by utilizing the screen within the vehicle to provide a low level of heat to survive bitter conditions until help arrives.

The primary objective of the invention is to provide an interior windshield screen which reflects sunlight during warm months to reduce the heat build-up in the interior of the vehicle and also to produce a radiant heat by using 12 volt DC current from the vehicle or from a rechargeable battery supply during cold months when ice or frost build-up on the windshield is likely. A secondary objective is to provide the screen device to be collapsible for convenient storage which may be easily deployed for use.

III. DESCRIPTION OF THE DRAWINGS

The following drawings are submitted with this utility patent application.

IV. DESCRIPTION OF THE PREFERRED EMBODIMENT

Figure 1:
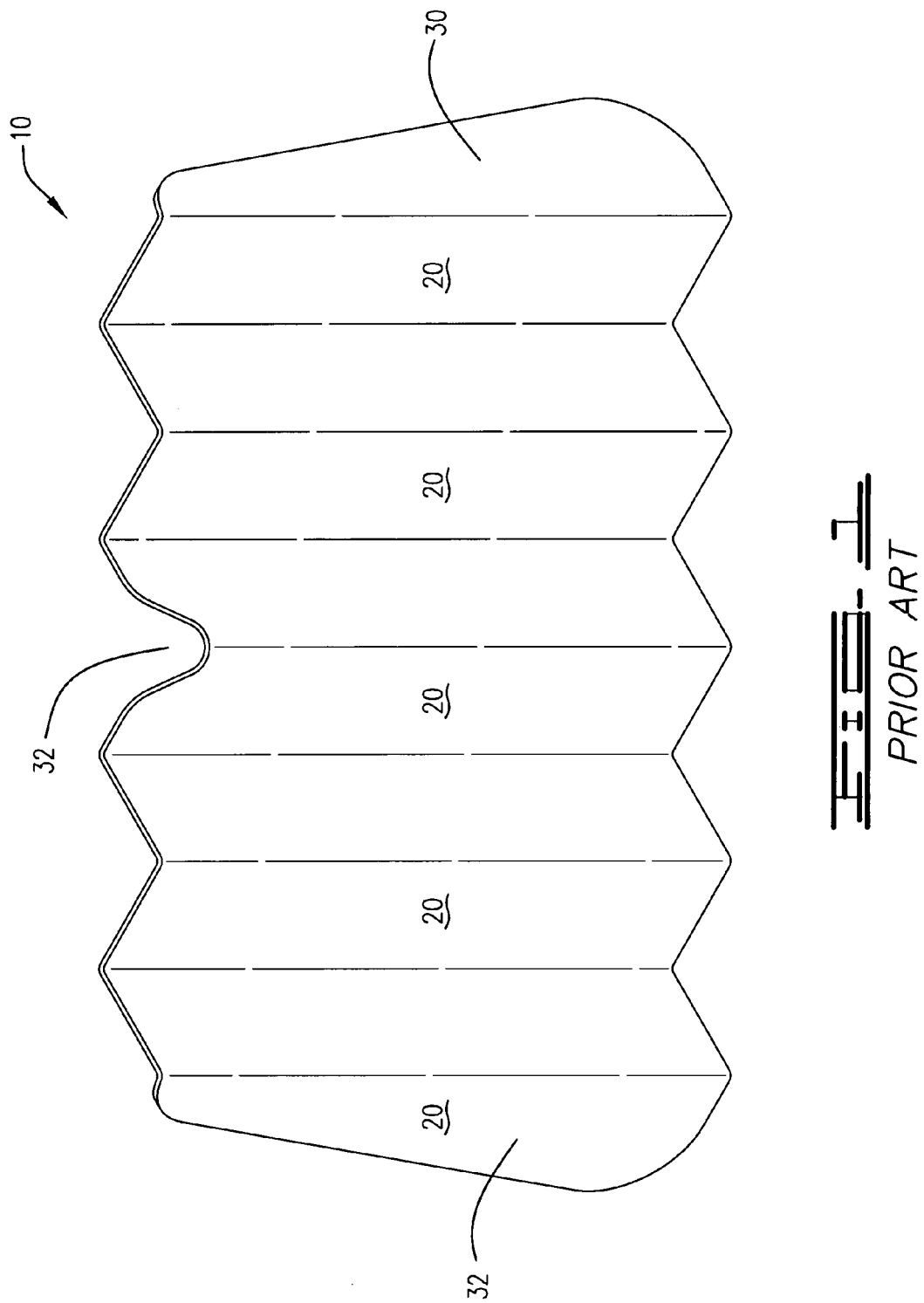
FIG. 1 is a front view of a prior art sunshade in a partially folded embodiment.

An all season windshield screen 10 placed upon the dashboard 104 within a vehicle 100 against a windshield 102 to deflect heat in the summer from the interior 105 of the vehicle 100 and providing a radiant heat source to the windshield 102 of the vehicle in the winter to inhibit ice and frost from accumulating on the windshield 102, shown in FIGS. 3-6 of the drawings, comprises a collapsible folding panel 20 having a front surface 30 and a rear surface 40, the front surface 30 directed towards the windshield 102 and having a plurality of radiant heating strips 34, and a plurality of solar cell panels 36, the rear surface 40 directed towards the interior 105 of the vehicle 100 and having a detachable first set of low voltage electrical leads 50 connected to the plurality of heat strips 34 through the collapsible folding panel 20 and a detachable second low voltage lead 55 connected through the collapsible folding panel 20 to the plurality of solar cell panels 36, and a rechargeable battery pack and controller unit 60 to which the first set of low voltage electrical leads 50 are attached to draw low voltage DC current from an internal low voltage power supply 65 and the second low voltage lead 55 is attached to recharge the internal low voltage power supply 65 from the plurality of solar cell panels 36, the rechargeable battery pack and controller unit 60 also attaching to a first end 72 of a low voltage cable 70 having a cigarette lighter adapter 76 attached to a second end 74 adapted to be inserted within a cigarette lighter to provide low voltage DC current to recharge the internal low voltage power supply 65 and to provide DC current to heat the plurality of radiant heat strips 36 on the front surface 30 of the collapsible folding panel 20, the rechargeable battery pack and controller unit 60 having a power selector switch 80 allowing a selection between the low voltage DC current from the low voltage cable 70, the internal low voltage power supply 65, or to turn the rechargeable battery pack and controller unit 60 off.

Figure 2:
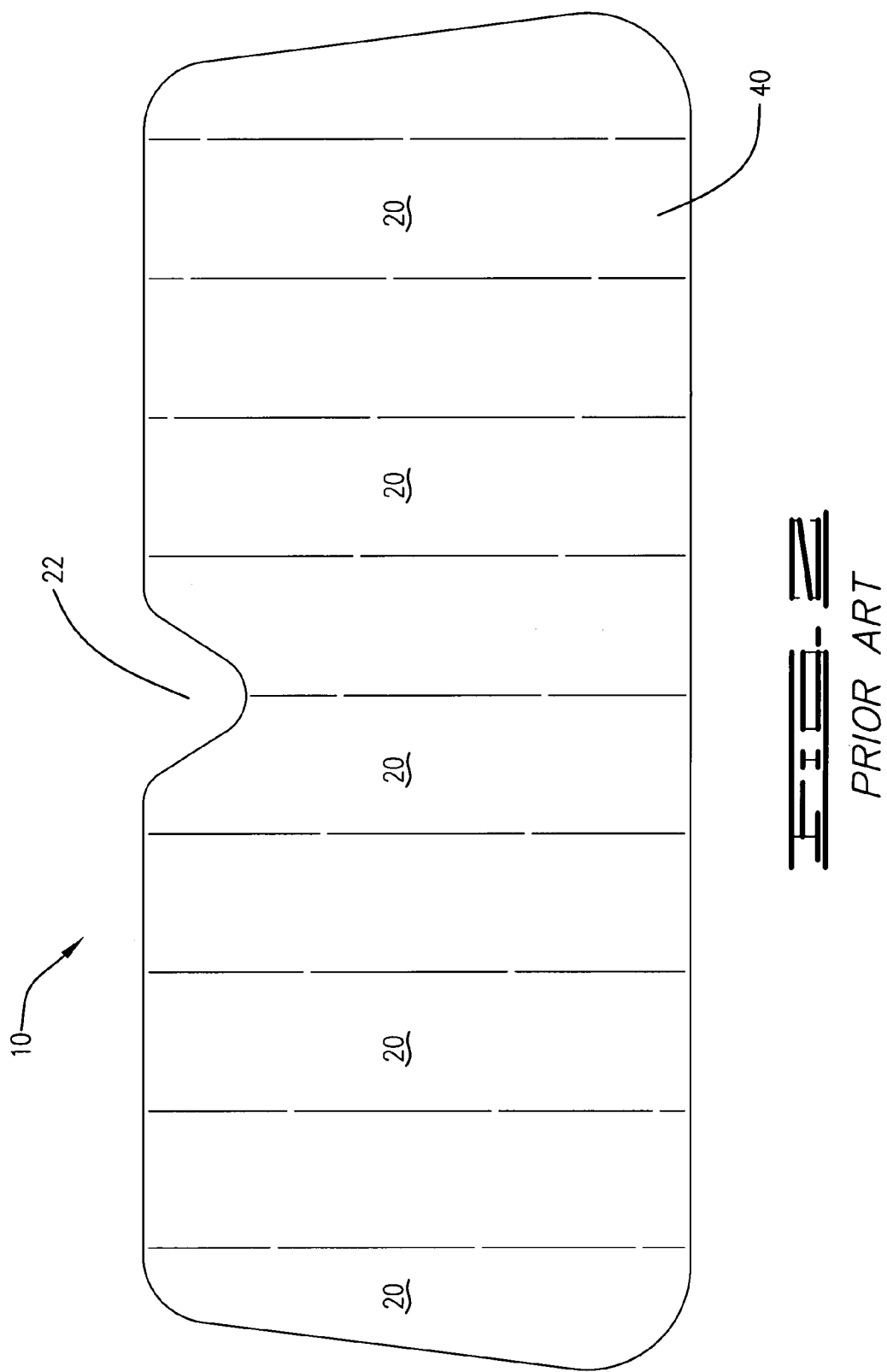
FIG. 2 is a rear view of the prior art sunshade in a flat embodiment
Figure 3:
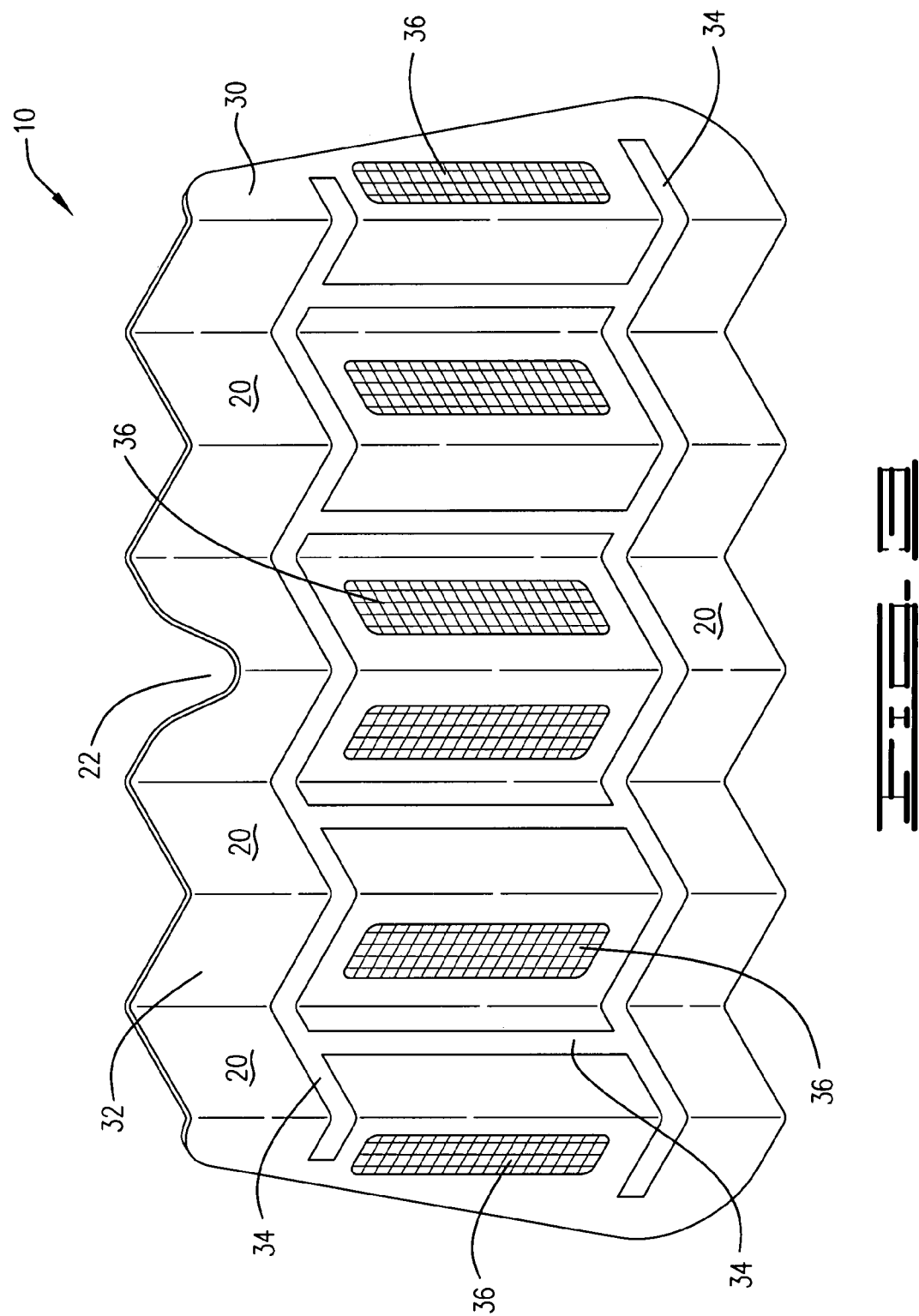
FIG. 3 is a front view of the deployed windshield screen constituting the present invention.
Figure 4:
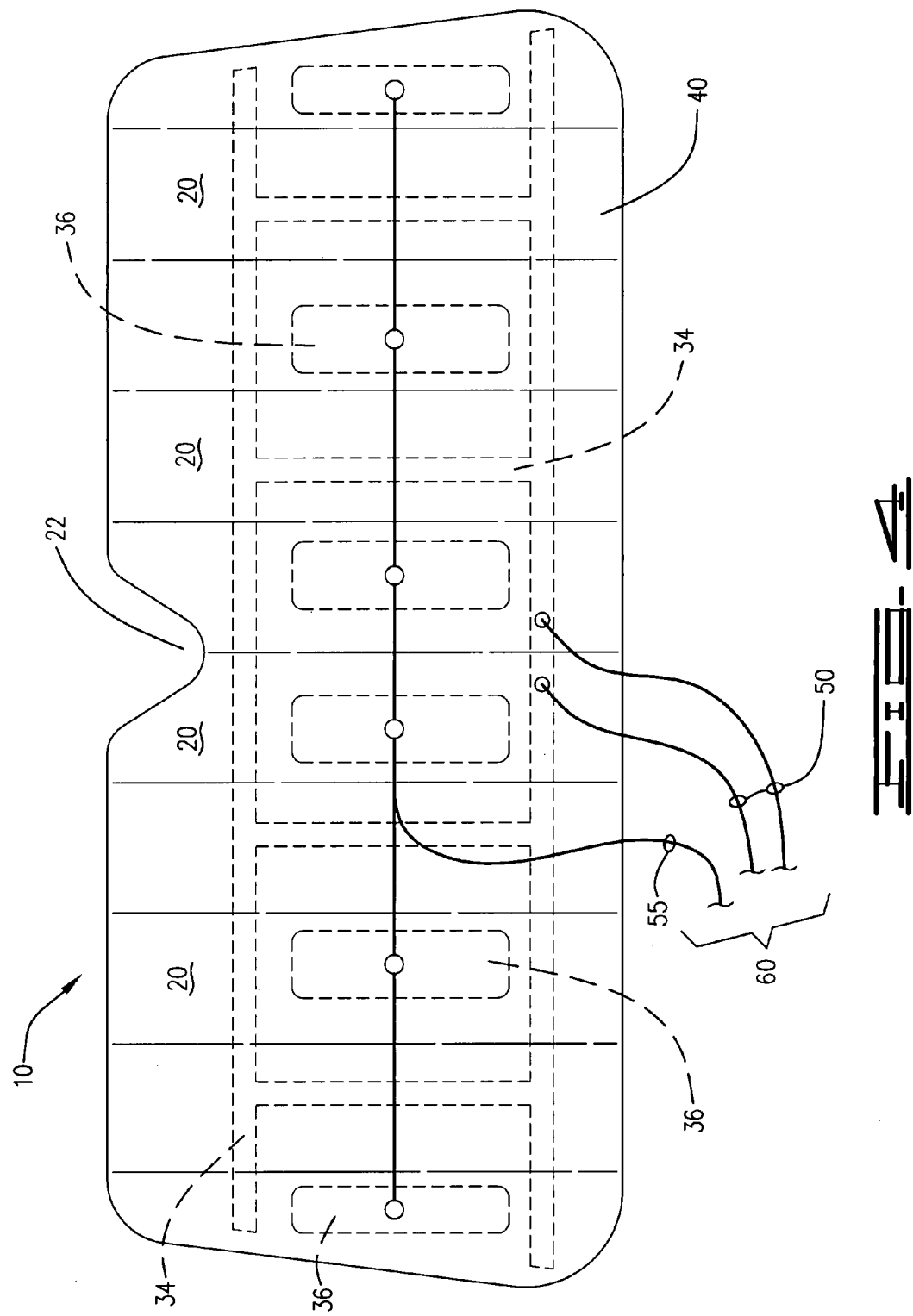
FIG. 4 is a rear view of the deployed windshield screen.
Figure 5:
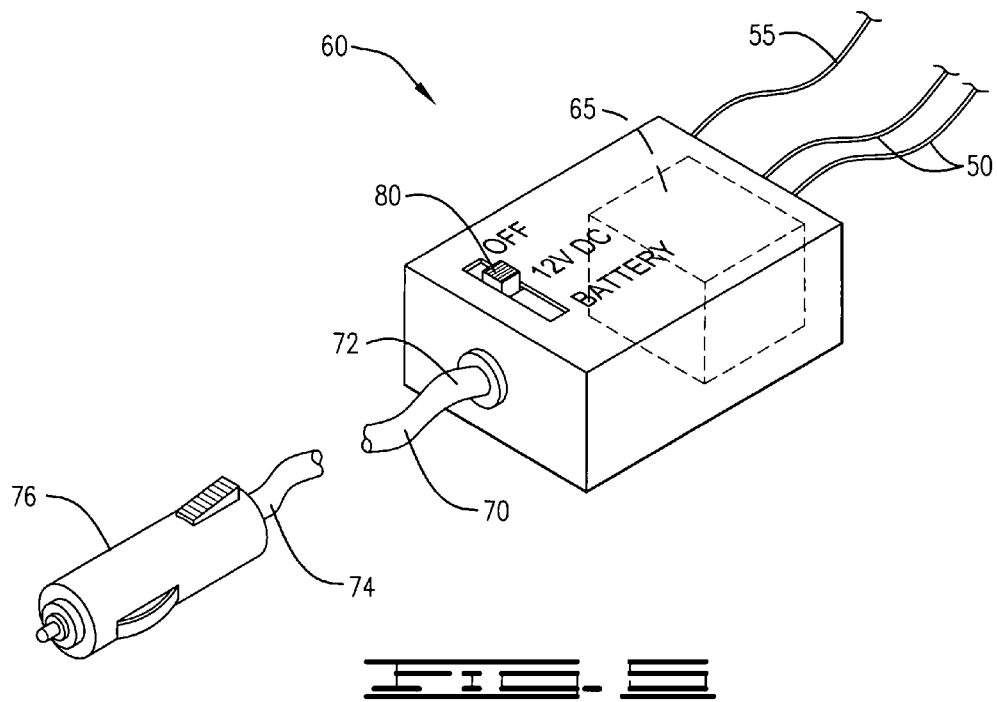
FIG. 5 is a view of the rechargeable battery pack and controller unit with the connected leads and low voltage cable.
Figure 6:
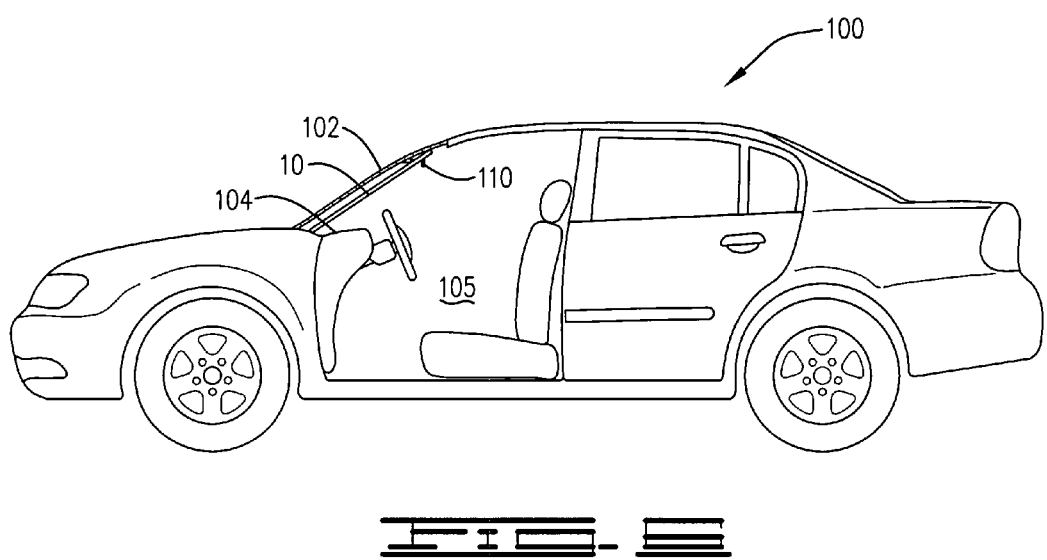
FIG. 6 is a side view of the windshield screen installed within the interior of a vehicle.

In addition, there may be some form of attachment of the front surface 30 of the screen 20 to the windshield 102, although not shown in the drawings, including the use of VELCRO or suction cups as indicated in the prior art. However, as illustrated in FIG. 6, the screen 10 may be installed by merely setting the screen 10 upon the dashboard 104 and, by use of a mirror slot 22 located within the collapsible folding panel 20, use a rear view mirror to retain the screen 20 in place upon the dashboard, similar to the installation of the prior art devices, FIGS. 1-2. The front surface 30 may also have a reflective outer layer 32 to reflect sunlight and heat during warm periods when the screen 10 is utilized to deflect heat from the interior 105. The collapsible folding panel 20 may be provided as several sheets connected together in an alternating folding pattern, as shown in both the prior art drawings, FIGS. 1-2, and the present windshield screen drawings, FIGS. 3-4, or as a fabric type wrinkle-resistant fabric with a flexible perimeter to be twisted into a compact configuration, not shown, either embodiment provided to allow for compact storage when collapsed into a compact configuration, yet expanded to cover most if not all of the windshield 102 when fully deployed, FIG. 6.

A timer may be integrated within the rechargeable battery pack and controller unit 60 to provide periodic current to the plurality of radiant heat strips 36 to optimize the amount of time the rechargeable battery pack and controller unit 60 would provide current to the plurality of radiant heat strips 36 and to prevent depletion of the vehicle 12 volt DC power source or the internal low voltage power supply 65. In addition, in an emergency situation, where a motorist may be stranded in the snow on the side of the road, the screen 10 may be used as a heat source to maintain a low level temperature within the vehicle until help arrives.

The first set of low voltage electrical leads 50 and the second low voltage lead 55 are disconnected from the collapsible folding panel 20 in the summer when the screen is simply used to deflect sunlight to prevent heat build-up in the vehicle 100 during the summer months. Only during the cold months where frost on the windshield 102 is possible or during winter storms where snow, sleet or ice accumulation on the windshield 102 may occur would the first set of low voltage electrical leads 50 attached to the rechargeable battery pack and controller unit 60, be connected to the collapsible folding panel 20, demonstrated in FIG. 4, to provide current to the plurality of radiant heat strips 36. When connected, the rechargeable batter pack and controller unit 60 may be placed upon the dashboard 104 against the rear surface 40 of the deployed collapsible folding panel 20.

While the invention has been particularly shown and described with reference to a preferred embodiment thereof, it will be understood by those skilled in the art that changes in form and detail may be made therein without departing from the spirit and scope of the invention.

What is claimed is:

1. An all season windshield screen placed upon a dashboard within a vehicle against a windshield to deflect heat from sunlight from the interior of the vehicle and to provide a radiant heat source to the windshield of the vehicle in the winter to inhibit ice and frost from accumulating on the windshield, the screen comprising:
  a collapsible folding panel having a front surface directed against said windshield during use, said front surface comprising a plurality of radiant heat strips;
  a detachable first set of low voltage electrical leads connected to said plurality of heat strips from said rear surface through said folding panel; and
  a rechargeable battery pack and controller unit attaching said first set of low voltage electrical leads providing a low voltage DC current between an internal rechargeable low voltage power supply contained within said rechargeable battery pack and controller unit and said plurality of radiant heat strips to create the radiant heat to the front surface of the collapsible folding panel.

2. The screen, as disclosed in claim 1, further comprising:
  a plurality of solar cells located on said front surface of said collapsible folding panel;
  a detachable second low voltage lead connected to said plurality of solar cell panels from said rear surface through said collapsible folding panel; and
  said rechargeable battery pack and controller unit attaching said first set of low voltage electrical leads drawing a low voltage DC current from an internal rechargeable low voltage power supply, further attaching said second low voltage lead to recharge said internal rechargeable low voltage power supply from said plurality of solar cell panels, and further attaching a first end of a low voltage cable having a second end terminating into a cigarette lighter adapter being adapted to a low voltage DC current source within said vehicle to recharge said internal rechargeable low voltage power supply and a direct DC current to said plurality of radiant heat strips.

3. The screen, as disclosed in claim 1, further comprising:
  a plurality of solar cells located on said front surface of said collapsible folding panel;
  a detachable second low voltage lead connected to said plurality of solar cell panels from said rear surface through said collapsible folding panel;
  said rechargeable battery pack and controller unit attaching said first set of low voltage electrical leads drawing a low voltage DC current from an internal rechargeable low voltage power supply, further attaching said second low voltage lead to recharge said internal rechargeable low voltage power supply from said plurality of solar cell panels, and further attaching a first end of a low voltage cable having a second end terminating into a cigarette lighter adapter being adapted to a low voltage DC current source within said vehicle to recharge said internal rechargeable low voltage power supply and a direct DC current to said plurality of radiant heat strips; and
  a power selector switch within said rechargeable battery pack and controller unit to select from said internal rechargeable low voltage power supply, direct DC current from said vehicle, or to an off position where there is no current.

4. An all season windshield screen placed upon a dashboard within a vehicle against a windshield to deflect heat from sunlight from the interior of the vehicle and to provide a radiant heat source to the windshield of the vehicle in the winter to inhibit ice and frost from accumulating on the windshield, the screen comprising:

a collapsible folding panel having a front surface directed against said windshield during use, said front surface further comprising a reflective outer layer, and a plurality of radiant heating strips, said folding panel also having a rear surface;

a detachable first set of low voltage electrical leads connected to said plurality of heat strips from said rear surface through said collapsible folding panel; and a rechargeable battery pack and controller unit attaching said first set of low voltage electrical leads providing a low voltage DC current between an internal rechargeable low voltage power supply contained within said rechargeable battery pack and controller unit and said plurality of radiant heat strips to create the radiant heat to the front surface of the collapsible folding panel.

5. The screen, as disclosed in claim 4, further comprising:

a plurality of solar cells located on said front surface of said collapsible folding panel;

a detachable second low voltage lead connected to said plurality of solar cell panels from said rear surface through said collapsible folding panel; and said rechargeable battery pack and controller unit attaching said first set of low voltage electrical leads drawing a low voltage DC current from an internal rechargeable low voltage power supply, further attaching said second low voltage lead to recharge said internal rechargeable low voltage power supply from said plurality of solar cell panels, and further attaching a first end of a low voltage cable having a second end terminating into a cigarette lighter adapter being adapted to a low voltage DC current source within said vehicle to recharge said internal rechargeable low voltage power supply and a direct DC current to said plurality of radiant heat strips.

6. The screen, as disclosed in claim 4, further comprising:

a plurality of solar cells located on said front surface of said collapsible folding panel;

a detachable second low voltage lead connected to said plurality of solar cell panels from said rear surface through said collapsible folding panel;

said rechargeable battery pack and controller unit attaching said first set of low voltage electrical leads drawing a low voltage DC current from an internal rechargeable low voltage power supply, further attaching said second low voltage lead to recharge said internal rechargeable low voltage power supply from said plurality of solar cell panels, and further attaching a first end of a low voltage cable having a second end terminating into a cigarette lighter adapter being adapted to a low voltage DC current source within said vehicle to recharge said internal rechargeable low voltage power supply and a direct DC current to said plurality of radiant heat strips; and a power selector switch within said rechargeable battery pack and controller unit to select from said internal rechargeable low voltage power supply, direct DC current from said vehicle, or to an off position where there is no current.

7. An all season windshield screen placed upon a dashboard within a vehicle against a windshield to deflect heat from sunlight from the interior of the vehicle and to provide a radiant heat source to the windshield of the vehicle in the winter to inhibit ice and frost from accumulating on the windshield, the screen comprising:

a collapsible folding panel having a front surface directed against said windshield during use, said front surface further comprising a reflective outer layer, a plurality of radiant heating strips, and a plurality of solar cell panels; said collapsible folding panel also having a rear surface;

a detachable first set of low voltage electrical leads connected to said plurality of heat strips from said rear surface through said collapsible folding panel;

a detachable second low voltage lead connected to said plurality of solar cell panels from said rear surface through said collapsible folding panel;

a rechargeable battery pack and controller unit attaching said first set of low voltage electrical leads drawing a low voltage DC current from an internal rechargeable low voltage power supply, further attaching said second low voltage lead to recharge said internal rechargeable low voltage power supply from said plurality of solar cell panels, and further attaching a first end of a low voltage cable having a second end terminating into a cigarette lighter adapter being adapted to a low voltage DC current source within said vehicle to recharge said internal rechargeable low voltage power supply and a direct DC current to said plurality of radiant heat strips; and a power selector switch within said rechargeable battery pack and controller unit to select from said internal rechargeable low voltage power supply, direct DC current from said vehicle, or to an off position where there is no current.

* * * * *